Patented Jan. 19, 1932

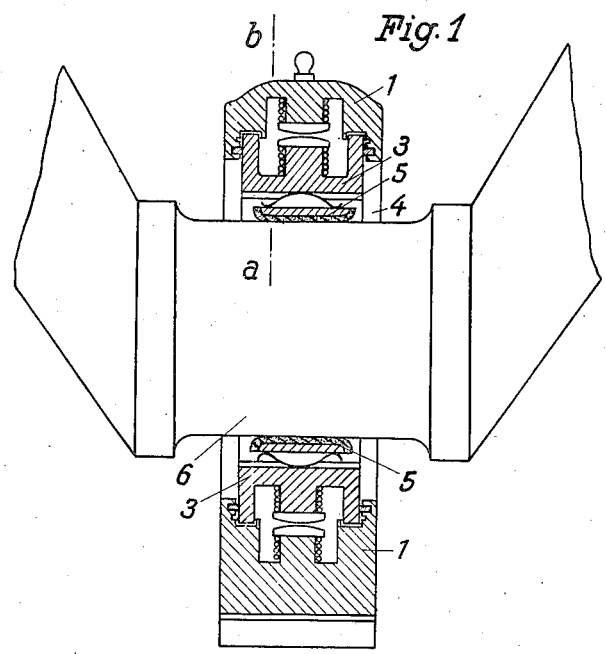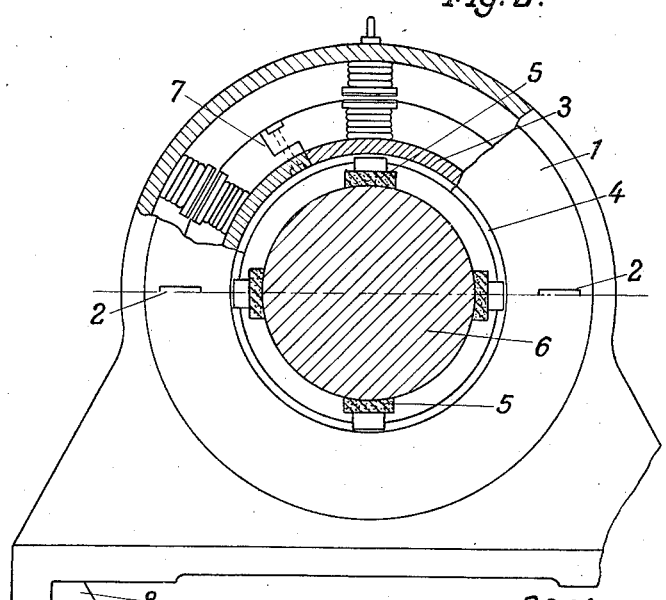

1,842,009

UNITED STATES PATENT OFFICE

WILHELM BRASCH, OF FRANKFORT-ON-THE-MAIN, GERMANY

MACHINE TOOL DRIVEN BY AN ELECTRIC MOTOR

Application filed February 15, 1930, Serial No. 428,718, and in Germany February 22, 1929.

This invention relates to a machine tool driven by an electric motor. The invention contemplates the employment of an electric motor, the rotor of which is axially hollow in known manner and is rotatably mounted within the stator. According to the invention one or more tools are arranged in the axial hollow space of the rotor.

This arrangement is particularly advantageous when cylindrical or round work-pieces are to be accurately and uniformly worked. In this case it is only necessary to mount the work-piece in the interior of the axial channel of the rotor in such a manner that the rotor carrying the tool or tools surrounds the work-piece.

In the case of known non-straight work-pieces such as crank shafts or the like which cannot merely be pushed into the hollow channel of the rotor, it is necessary to construct the electric motor and especially the rotor, in such a way that it can be divided or dismantled in order to enable it to be placed around the work-piece or within the stator.

The employment of the hollow rotor as a tool carrier surrounding the work-piece on all sides is particularly important when working cylindrical or round work-pieces, since in this way a completely uniform rotation of the tool or tools is assured.

The hitherto usual belt or gear drives usually gave rise to irregularities in consequence of their one-sided pressure for example flats when grinding or polishing, or non-circular rotation. The invention considerably facilitates the operation when grinding, turning or polishing cranks or crank shafts and the like work-pieces.

The invention is also applicable to running in bearings (bushes and the like) for shafts or spindles. In such case, the bearing is arranged in the axial hollow space of the rotor, in such a way that it surrounds the shaft on to which it is to run. The shaft or the spindle itself remains stationary and only the bearing rotates with the rotor of the electric motor.

In contradistinction to the hitherto usual methods of running in bearings, the method of the present invention offers extraordinary advantages. It is no longer necessary to set in motion large masses of machinery (gears or entire machines) in order to run the bearing in, and consequently considerable economy in power and operating costs is achieved.

A further advantage consists in that no difficulties are encountered in controlling the temperature during the running in of the bearing. Such a temperature control was impossible or possible only with difficulties in machines in actual operation particularly locomotives and was also very difficult if not impossible in stationary plant especially when running in crank shafts and the like.

In order more clearly to understand the invention, reference is made to the accompanying drawings, which illustrate by way of example one embodiment thereof and in which:—

Fig. 1 represents a vertical cross section; and

Fig. 2 is a side elevation partly in section along the line a—b of Fig. 1.

The electric motor illustrated may either be constructed as a direct current commutator motor, slip ring armature motor, or also as an alternating current induction motor with short circuited armature.

The stator 1 is divided at 2 into two separable portions or it may be divided into a greater number of separable portions. The rotor 3 is mounted in the stator 1, on annular bearings, ball bearings or the like, without any shaft, in such a manner that an axial channel 4 is formed in the interior of the rotor.

This cylindrical space 4 is utilized by arranging therein tools 5 of any desired kind for the purpose of working on cylindrical work-pieces. The work-piece, for example, a crank shaft 6 is surrounded on all sides by the tools 5, arranged in the interior periphery of the rotor. In order to enable the rotor 3 to surround the work-piece it is subdivided at 7 in a similar manner as the stator 1.

In carrying out the invention all known arrangements for advancing the tools or the like may be employed, for example, the electric motor may be mounted on rails 8 and displaceable along the same in relation to the work-piece. Similarly, the tools 5 may be fed toward the work, either manually or automatically, by the customary feeding arrangements. As illustrated, the tools 5 are adjusted automatically by the leaf springs 8 which seat between ribs 9 on the rotor 3 and bear against the respective tools 5.

When machining work-pieces with the electrically driven machine illustrated, arrangements may also be provided for imparting to the work-pieces a rotary motion preferably in the opposite sense to the rotary motion of the tools.

I claim:—

1. In an electrically driven machine, the combination with a stator, of a rotor mounted in said stator and having a hollow axial portion for accommodating a work-piece, and means carried by said rotor for operating upon said work piece.

2. The invention as set forth in claim 1, wherein means are provided for rotating the work-piece in a direction opposite to the direction of rotation of said rotor.

3. The invention as set forth in claim 1, wherein is provided a sled longitudinally displaceable in relation to the work-piece and said stator and rotor are mounted on said sled.

4. The invention as set forth in claim 1, wherein means are provided for adjustably moving said first means into contact with said work-piece.

5. The invention as set forth in claim 1, wherein said means comprises a machine tool.

6. The invention as set forth in claim 1, wherein said means comprises an abrasive member.

7. The invention as set forth in claim 1, wherein said means comprises a bearing for said work-piece.

8. In electrically driven machining apparatus, the combination with a stator, of a rotor having a hollow axial portion, and a plurality of tools carried by said rotor and equally spaced around the internal circumference thereof.

In testimony whereof, I affix my signature.

WILHELM BRASCH.